US010432390B2

United States Patent
Neumann (10) Patent No.: US 10,432,390 B2
(45) Date of Patent: Oct. 1, 2019

(54) METHOD, DEVICE, AND SYSTEM FOR THE RECEIVER-SIDE DETERMINATION OF A SCANNING INSTANT

(71) Applicant: Inova Semiconductors GmbH, München (DE)

(72) Inventor: Roland Neumann, München (DE)

(73) Assignee: Inova Semiconductors GmbH, München (DE)

(*) Notice: Subject to any disclaimer, the term of this patent is extended or adjusted under 35 U.S.C. 154(b) by 13 days.

(21) Appl. No.: 15/739,612

(22) PCT Filed: Jun. 23, 2016

(86) PCT No.: PCT/EP2016/001074
§ 371 (c)(1),
(2) Date: Dec. 22, 2017

(87) PCT Pub. No.: WO2017/008885
PCT Pub. Date: Jan. 19, 2017

(65) Prior Publication Data
US 2018/0183563 A1   Jun. 28, 2018

(30) Foreign Application Priority Data

Jul. 15, 2015 (DE) .................. 10 2015 111 465

(51) Int. Cl.
*H04L 7/00* (2006.01)
*H04L 25/03* (2006.01)
*H04L 1/00* (2006.01)

(52) U.S. Cl.
CPC ............ *H04L 7/007* (2013.01); *H04L 1/0047* (2013.01); *H04L 7/0016* (2013.01); *H04L 25/03343* (2013.01); *H04L 25/03834* (2013.01)

(58) Field of Classification Search
CPC ......... H04L 7/007; H04L 7/042; H04L 7/033; H04L 7/0004; H04L 7/0334;
(Continued)

(56) References Cited

U.S. PATENT DOCUMENTS

| 2003/0185322 A1* | 10/2003 | Takahashi ......... H04L 25/03025 375/350 |
| 2010/0327924 A1 | 12/2010 | Hasegawa et al. |
| 2012/0226726 A1* | 9/2012 | Pimentel ............... G06F 17/505 708/270 |

FOREIGN PATENT DOCUMENTS

| DE | 19717642 | 11/1998 |
| DE | 19904956 | 1/2001 |

(Continued)

OTHER PUBLICATIONS

"International Application No. PCT/EP2016/001074, International Preliminary Report on Patentability dated Oct. 24, 2017", (Oct. 24, 2017), 10 pgs.

(Continued)

*Primary Examiner* — David C Payne
*Assistant Examiner* — Sarah Hassan
(74) *Attorney, Agent, or Firm* — Schwegman Lundberg & Woessner, P.A.

(57) ABSTRACT

The present invention is directed to a method, an apparatus and a system for error-free detection of bit values which are transmitted using a continuous data signal. For this purpose, a particularly advantageous metric is proposed, which makes a conclusion possible as to an optimum time for sampling the data signal and thus makes it possible to detect the bit value unambiguously.

10 Claims, 7 Drawing Sheets

(58) Field of Classification Search
CPC ....... H04L 7/0054; H04L 27/22; H04L 27/06;
H04L 27/2627; H04L 2027/0024; H04L
25/03343; H04L 25/03834; H04L 27/2656
USPC .......................................................... 375/235
See application file for complete search history.

(56) References Cited

FOREIGN PATENT DOCUMENTS

| | | |
|---|---|---|
| DE | 10131207 | 1/2003 |
| DE | 10334064 | 4/2005 |
| EP | 2696547 | 2/2014 |
| EP | 2779551 | 9/2014 |
| WO | WO-2017008885 | 1/2017 |

OTHER PUBLICATIONS

"International Application No. PCT/EP2016/001074, International Search Report and Written Opinion dated Sep. 21, 2016", (Sep. 21, 2016), 12 pgs.

\* cited by examiner

METHOD, DEVICE, AND SYSTEM FOR THE RECEIVER-SIDE DETERMINATION OF A SCANNING INSTANT

PRIORITY CLAIM TO RELATED APPLICATIONS

This application is a U.S. national stage application filed under 35 U.S.C. § 371 from International Application Serial No. PCT/EP2016/001074, which was filed 23 Jun. 2016, and published as WO2017/008885 on 19 Jan. 2017, and which claims priority to German Application No. 10 2015 111 465.8, filed 15 Jul. 2015, which applications and publication are incorporated by reference as if reproduced herein and made a part hereof in their entirety, and the benefit of priority of each of which is claimed herein.

The present invention relates to a method for determining a sampling time and to a corresponding apparatus. A sampling time is determined so as to cause a signal strength of a data signal to be measured at a discrete time at which there is a low probability of misinterpreting the measurement. Interpreting the signal strength includes mapping a measurement result to a bit configuration. As a result, the method according to the invention may also advantageously be used as a method for setting a measurement point or sampling time or equally for measuring a current strength or voltage swing. The sampling time may be determined so as to trigger at least one sampling of a carrier medium.

EP 2 779 551 A2 discloses a method for controlling data transmission settings (transmitter control).

DE 10 334 064 B3 discloses a method for calibrating a discrete sampling control system, which influences the sampling time of a received signal in a mobile receiver, of a sampling phase selection element, by setting quantisation intervals of a sampling time error signal, a predetermined value of the discrete sampling control signal being assigned to each quantisation interval.

DE 199 04 956 C2 teaches a method for automatically setting a sampling time of a digital correlation receiver for data transmission, which is pre-synchronised by suitably selecting the CVBS signal and in which the useful signal has corresponding sampling times along the signal form in the receiver.

DE 19 717 642 A1 discloses a method for data regeneration in which a control criterion for a phase control circuit which generates a sampling clock signal is derived from a received signal, and proposes that transmitted data are secured using an error-correcting code, that the transmission error rate is determined continuously on the receiver side, and that on an experimental basis a controlled phase shift of the sampling signal with respect to the received signal and thus the sampling time are altered and that the optimum sampling time can be determined on the basis of the measured transmission error rates.

Methods are known which adapt a distorted value measured on a carrier medium in such a way that a probably correct value can be outputted. These include error-correcting methods which compensate an expected error in that a corrective value inverse to the error is modulated onto the received data signal so as to arrive at the correct value. Further, in accordance with the prior art, it is possible to modulate an error expected from the carrier medium onto the signal to be transmitted, inversely and in advance, in such a way that the error is corrected without further assistance when the pre-modulated signal is transmitted.

Conventional methods have the drawback that, in complex and error-prone method steps, either before or after transmission, a signal has to be error-corrected in such a way that a target signal value is achieved. Further, known methods are based on pre-distorting a signal so as to generate as suitable a signal as possible, having steep flanks and a high amplitude, but fail also to calibrate the suitable time for this optimised signal. In this context, transmission parameters and/or filter coefficients are not taken into account in such a way that a reliable prediction can be made as to a suitable time for sampling the continuous data signal.

Accordingly, an object of the present invention is to provide a method for determining and optionally setting a sampling time which reduces the error rate. Thus, without acting on the signal directly, an optimum measurement point should be set at which the signal strength behaves in such a way that it reflects the value to be coded as precisely as possible or is far enough away from a threshold that a reliable prediction can be made as to falling below or rising above the threshold. The proposed method and the proposed apparatus should be operable without great technical complexity and should also be combinable with other hardware components in such a way that they can be reused. A further object of the present invention is to provide a correspondingly implemented apparatus and a system comprising the apparatus.

The object is achieved by the subject matter of claim 1.

Accordingly, a method for receiver-side determination of a sampling time of a continuous data signal and for detecting a bit value within a bit width of a serial bit data stream is provided. In the method according to the invention, at least one filter coefficient of the continuous data stream, provided for modulating the continuous data signal to be transmitted by way of a data signal compensation device, is measured, and the sampling time is determined as a function of the at least one measured filter coefficient and a provided sampling time metric, in such a way that an amplitude of the continuous data signal to be transmitted achieves a maximum at this sampling time.

Receiver-side determination of the sampling value of a data stream requires a transmitter which modulates the continuous data signal onto a carrier medium. However, the transmitter need not be implemented specially, and so the method according to the invention can be operated using conventional transmitters. The transmitter is communicatively connected to the receiver via at least one carrier medium, in such a way that they exchange communication signals. The transmitter is typically implemented so as to transmit a bit stream, in other words an arbitrarily long sequence of individual bits, by way of the continuous data stream. In this context, a signal strength above a threshold at a particular time codes a set bit and a signal strength below the threshold codes an unset bit. Because a progression of a signal strength has to be coded approximately and in a non-binary manner for technical reasons, this results in a curve which approximately maps a continuous progression of the signal strength onto the medium. Thus, at individual disadvantageous times, it is not possible to make a prediction as to whether a bit is actually set or not. This is the case if a signal strength has a value close to the threshold. According to the invention, this is counteracted by determining particularly carefully at what time the amplitude of the signal progression has a maximum.

It is particularly advantageous that according to the invention, without adapting the transmitter, not only is sampling at these disadvantageous times, in other words when a signal strength is close to the threshold, avoided on the receiver side, but sampling actually takes place at maximum amplitude. This guarantees that the signal strength is far enough away from the threshold at a measurement time, in other words the sampling time. The sampling time is arranged temporally within a bit width which is definitely coded within the timespan of the relevant bit to be transmitted. Thus, the sampling time should be selected within this bit width in each case, and reads a bit configuration in each case. The individual bit widths which subdivide the serial bit data stream into individual bits are typically temporally equidistant.

Samplings which are typically carried out may involve sampling times at the temporal centre of a bit width. Thus, the signal strength increases for example at a change from a coded zero to a coded one around the start of the bit width, reaches a maximum approximately in the centre of the bit width, and falls afterwards if a zero is subsequently to be coded. Thus, the centre of a bit width may be selected as a reference point for a suitable sampling time. To improve the sampling time further, according to the invention the sampling time is time-shifted as a function of at least one measured filter coefficient, in such a way that the sampling point is time-shifted to the amplitude maximum.

The sampling point determined in accordance with the invention is advantageous for a plurality of transmitted bits or bits to be transmitted, and thus statistically speaking reduces the average bit error rate.

Typically, the sampling takes place at a fixed delay, which according to the invention is optimised in such a way that the sampling takes place at a suitable time, in such a way that the error quota of the transmission, in other words of the detection of a bit value for each bit width, is as low as possible. Thus, according to the invention it is advantageous that not only can reliable data transmission be ensured, but transmission capacity can also be increased, since erroneously transmitted or erroneously detected bits need not be retransmitted. For example, it is possible to check a plurality of bits, which form a word, for correctness, and to retransmit the word if an error is detected. Retransmission of this type can be avoided according to the invention, since the error rate is reduced by comparison with known methods.

In known methods, an increase of this type in the transmission capacity is possible by way of a technically complex increase in the clock frequency or oversampling. However, according to the invention this is avoided, since in this case the error rate would also increase. An increase in the clock frequency implicitly reduces the bit width, in such a way that a timespan at which there is an amplitude maximum in each case is only briefly achieved. Thus, determination of a suitable sampling time is complex and error-prone. According to one aspect of the present invention, it is possible to raise the data throughput without increasing the clock frequency, and for this purpose to determine the suitable sampling time in such a way that a need to retransmit erroneously detected bits by means of the continuous data signal is reduced.

In one aspect of the present invention, at least one filter coefficient before and at least one filter coefficient after a sampling which is being or is to be carried out are measured. This has the advantage that according to the invention the time at which the amplitude of the data signal is at a maximum can be determined to a high precision. For this purpose, it may be advantageous to measure the filter coefficients at a receiver or read them out from a data memory. Further units may also be read out, which for example provide corresponding coefficients. Thus, according to the invention it is possible to read out a further data transmission component which calculates and provides filter coefficients. This can take place by way of an algorithm for providing filter coefficients, in particular an LMS algorithm. The LMS algorithm may be a least mean squares algorithm for approximating the solution to a least mean squares problem or a variation of this algorithm. By taking into account at least one filter coefficient before and after each measurement point, the precision is advantageously improved by way of the proposed method, in such a way that, as a result of the maximum amplitude level, there is a lower error probability in the interpretation of the data signal for detecting a bit value.

According to one aspect of the present invention, taking into account filter coefficients after a sampling is carried out is merely based on at least one filter coefficient after a sampling, which is planned, has already been carried out or is to be carried out, of the continuous data signal. Thus, a sampling which is carried out may already have been carried out in previous iterations, but it is particularly advantageous to estimate the sampling time before an actual sampling and to take corresponding filter coefficients into account for this sampling time. In this context, a person skilled in the art is aware of further options for determining a filter coefficient after a sampling which is carried out.

According to a further aspect of the present invention, it may be advantageous to select precisely one filter coefficient before a provided sampling time and precisely one filter coefficient after a provided sampling time. Since filter coefficients are modulated onto a continuous data signal so as to generate an adapted, advantageous data signal, it may be particularly advantageous to take into account exactly one filter coefficient before and after each sampling time. These may be selected in such a way that, of a plurality of filter coefficients, precisely those which are applied temporally immediately before and immediately after a sampling time are selected. Whereas typically the same filter coefficients are always used, according to the invention it is thus provided that a plurality of filter coefficients are used, which are applied to the continuous data signal and may be different in each case. Thus, according to the invention, the flanks of a continuous data stream can be modulated more precisely. Further, these different filter coefficients may be taken into account in determining the sampling time.

According to a further aspect of the present invention, the at least one filter coefficient is measured either only before or only after a sampling which is carried out. This has the advantage that according to the invention a particularly efficient method for determining a sampling time is proposed. Generally speaking, the parameters of the filter coefficients can be determined by way of a sampling metric, which describes what properties the filter coefficients have in such a way that these are taken into account. In this context, it is possible to provide that for example only filter coefficients before a sampling time are taken into account. A metric of this type may either be provided as a set of control commands or be implemented hard-wired into a correspondingly implemented hardware component.

According to a further aspect of the present invention, the at least one filter coefficient is measured by at least one measurement method from a set of measuring methods, the set comprising reading out at least one measurement sensor, calculation as a function of transmission parameters, determination, reading out a data memory, reading out a transmission configuration, evaluating an algorithm, in particular an LMS algorithm, determining at least one precursor and determining at least one postcursor. This has the advantage that a large number of suitable measurement methods can be used which are already implemented in a corresponding device and can be reused. It is also possible according to the invention advantageously to combine the individual methods, in such a way that a plurality of methods can be used simultaneously. Thus, for example, a first filter coefficient can be measured at the receiver, and a second filter coefficient can be calculated by means of a correspondingly implemented algorithm. A combination of the measurement methods is also advantageous.

According to a further aspect of the present invention, the sampling time metric provides that the sampling time is determined as a function of a total of signal strengths of the measured filter coefficients. This has the advantage that the signal strengths of the filter coefficients can be taken into account in a simple manner, merely by way of addition. This can be implemented at merely a low technical complexity, but still makes precise determination of the sampling time possible.

According to a further aspect of the present invention, the sampling time metric provides that the sampling time is at the minimum of the total of the signal strengths of the measured filter coefficients. This has the advantage that according to the invention an optimum measurement time is found. An optimum measurement time can be defined as a sampling time at which the amplitude of the transmitted data signal is highest. This is designated as optimum because the maximum amplitude ensures that the bit value, which is defined by a time interval and the signal strength of the continuous data signal, can be read out as unambiguously as possible. Since a pre-set threshold determines whether a signal strength is interpreted as a zero or as a one at a sampling time, it is particularly advantageous to have a particularly clear delimitation for the threshold, in such a way that as unambiguous a prediction as possible can be made as to the presence of a signal strength above or below the threshold. This is possible in particular at a maximum amplitude, and this is made use of according to the invention. For this purpose, the proposed metric has been found to be particularly reliable in series of tests.

According to a further aspect of the present invention, the sampling time metric is provided by at least one provision method from a set, the set comprising reading out a data memory, providing a hard-wired metric unit, providing a metric unit implemented in hardware, providing a metric circuit, providing a correspondingly wired metric component, providing a control unit, and providing a control unit. This has the advantage that the metric according to the invention can be provided on the basis of a plurality of options which can be combined with out another particularly synergistically. Thus, the metric can be implemented distributed over a plurality of calculation modules, each module providing at least part of the proposed metric.

According to a further aspect of the present invention, the sampling time to be determined is determined relative to a further time from a set of times, the set comprising: a further sampling time, a bit width boundary, a data signal flank and a measured amplitude level. This has the advantage that the sampling type can be determined relatively, but also absolutely, on the basis of known times.

According to a further aspect of the present invention, a data signal strength is determined so as to measure at least one filter coefficient. This has the advantage that the filter coefficients can be determined empirically and that errors in reading out filter coefficients can be prevented. Thus, the filter coefficient in question can be determined in a simple manner.

According to a further aspect of the present invention, the data signal compensation device is formed as at least one unit from a set of units, the set comprising: a control unit, a switchboard, a distortion module, a pre-distortion module, a receiver and a transmitter. This has the advantage that according to the invention pre-existing devices can be adapted and subsequently reused. It is thus possible to adapt pre-existing systems in such a way that they implement the method according to the invention.

According to a further aspect of the present invention, the continuous data signal is transmitted using at least one signal carrier medium from a set of media, the set comprising: a cable, a conductive connection, a differential line, a coaxial line and a bus line. This has the advantage that the proposed method and the proposed apparatus are compatible with a plurality of signal carrier media, and thus existing systems can advantageously be expanded with different signal carrier media. In particular, a plurality of stages of the signal transmission may each be bridged using different signal carrier media.

According to a further aspect of the present invention, a measurement device is read out at a predetermined or determined time to determine the amplitude of the data signal. This has the advantage that the amplitude can be measured empirically without further interposed components. It is also possible to carry out the step iteratively and to capture measurement values using a plurality of predetermined times.

The object is also achieved by an apparatus for receiver-side determination of a sampling time of a continuous data signal and for determining a bit value within a bit width of a serial bit data stream, comprising a measurement unit implemented so as to measure at least one filter coefficient which is provided for modulating the data signal to be continuously transmitted by way of a data compensation device, and a sampling time unit for determining the sampling time as a function of the at least one measured filter coefficient and a provided sampling time metric, in such a way that an amplitude of the data signal to be continuously transmitted achieves a maximum at this sampling time.

The object is also achieved by a communication system comprising at least one of the disclosed apparatuses. The object is also achieved by a computer program which causes one of the disclosed methods to be carried out and by a computer program product which stores corresponding commands.

In the following, individual aspects of the present invention are explained by way of example with reference to the drawings, in which.

Figure 1:
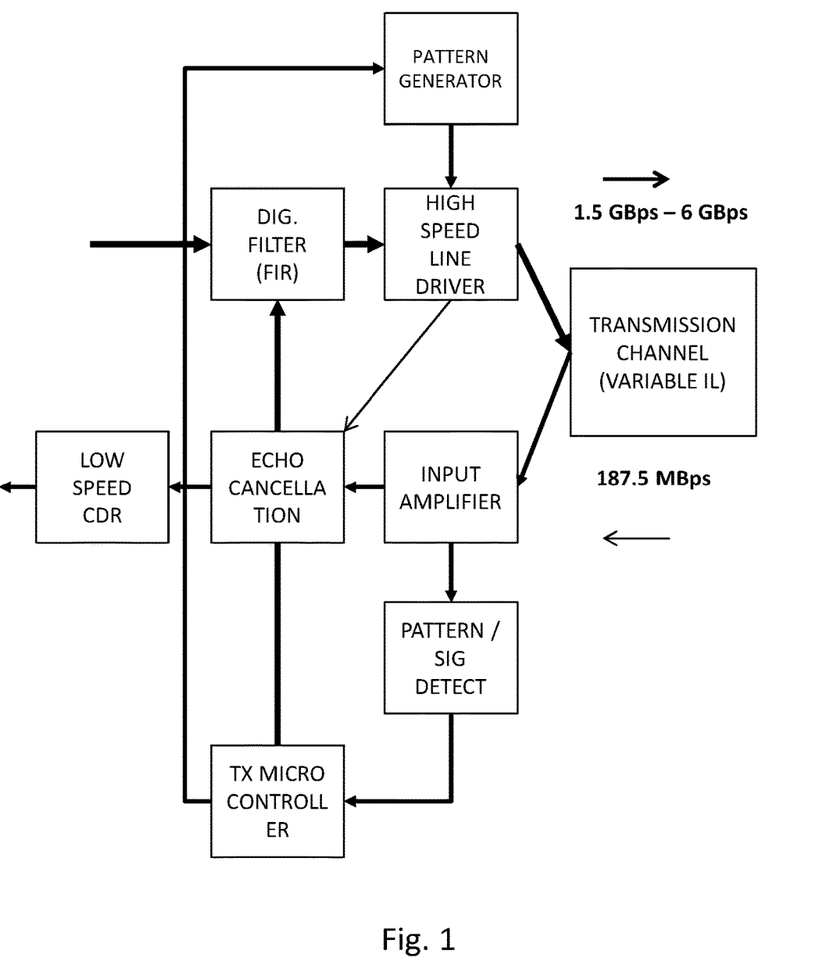
FIG. 1 shows a transmission unit in accordance with an application scenario of determining a sampling time in accordance with an aspect of the invention.

FIG. 1 shows a transmission device comprising a plurality of devices implemented so as to generate a data stream. This generated data stream is subsequently modulated onto a transmission channel. This takes place for example by applying suitable voltage to the transmission channel. In some cases known components may be used to generate the data signal, which among other things promote noise suppression or cause signal amplification so as to transmit the data signal via the transmission channel in as error-free a manner as possible. According to the invention, the transmission channel is formed as at least one carrier medium which communicatively couples the transmitter of the data signal to the receiver of the data signal. It is also possible to provide a plurality of semiconductor modules which bring about the control commands for carrying out the disclosed steps. The present invention can be operated using conventional transmitters, but the invention is equally directed to a system comprising a transmitter and the apparatus according to the invention which are communicatively coupled to one another.

Figure 2:
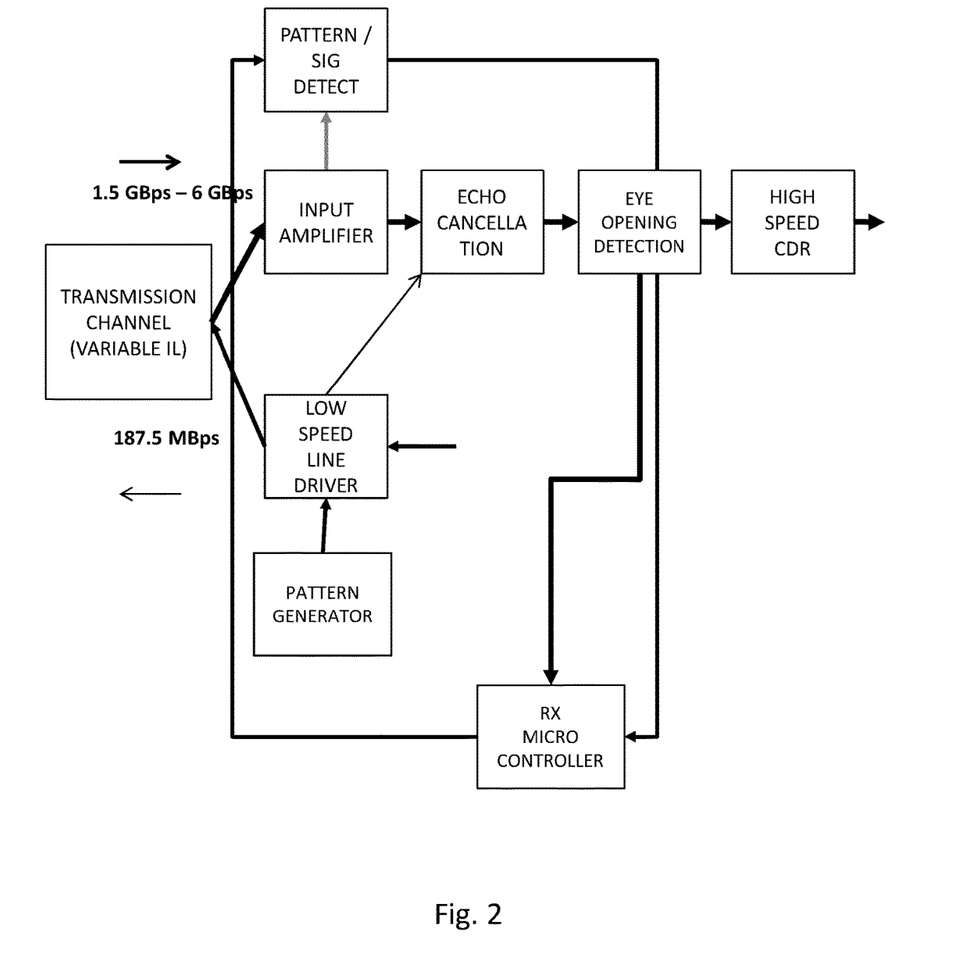
FIG. 2 shows a receiving unit in accordance with an application scenario of determining a sampling time in accordance with an aspect of the invention.

FIG. 2 shows a receiver for receiving the data stream, which is fed into the transmission channel on the right of FIG. 1 and thus transmitted using the transmission channel or the carrier medium on the left of the present FIG. 2 and subsequently received. According to the invention, the receiver has a component which is implemented so as to provide the functionality of the apparatus for receiver-side determination of a sampling time. In this context, the functionality may be implemented in one of the units shown or be provided as a separate component.

As can be seen from FIGS. 1 and 2, the transmitter and the receiver may each transmit data streams to one another. This may take place simultaneously or with a time offset. Thus, according to the invention it is possible for the transmitter according to FIG. 1 and the transmitter according to FIG. 2 to switch roles and thus in particular for the receiver side implemented in accordance with the invention to be arranged in accordance with FIG. 1. Thus, in accordance with an aspect of the present invention it is possible merely to provide at least one transmitter and at least one receiver which exchange data. Thus, any desired number of transmitters and receivers can be communicatively connected.

Figure 3:
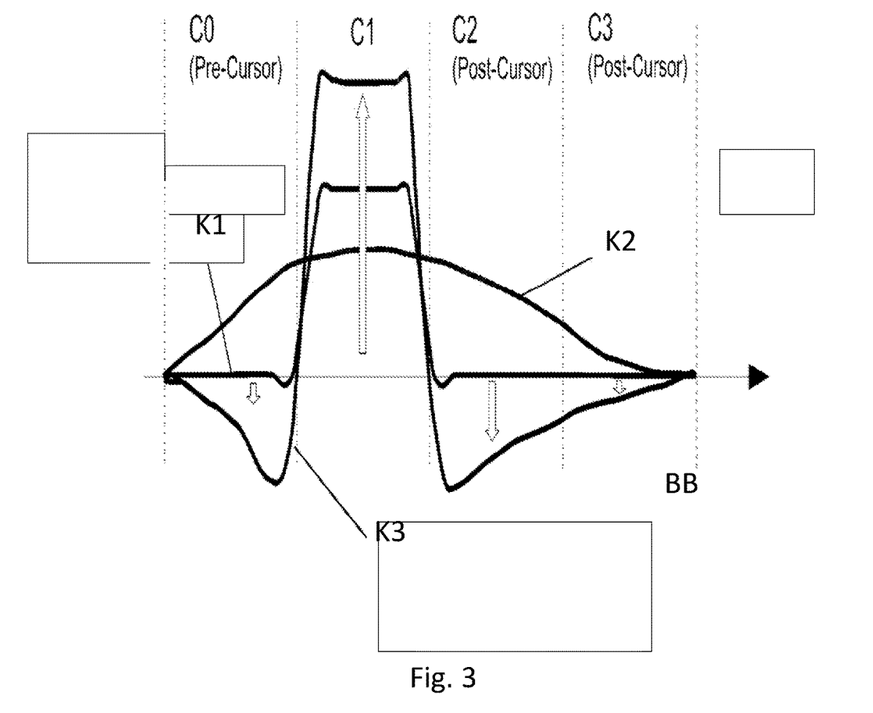
FIG. 3 is a diagram of a progression of a continuous data stream in accordance with and aspect of the present invention.

FIG. 3 shows a progression of a continuous data signal, the continuous time being plotted on the X-axis and a signal strength of the continuous data signal being plotted on the Y-axis. In this context, the curve K2 shows a signal progression of a data signal as transmitted without corrective modulation. A disadvantage of this is the lack of an option for precisely coding a bit value. If a bit sequence comprising the bit configuration 010 is to be transmitted in this case, K2 provides imprecise coding, since the flanks merely rise and fall slowly and thus a coding of the bits is mapped disadvantageously. Therefore, a curve K3 is modulated onto the data signal, and, for example by way of filter coefficients C0 and C2, brings about a steep rise in the flank from 0 to 1 and a steep fall in the flank from 1 to 0. The curve K3 modulated onto K2 thus brings about the advantageous curve progression of K1. This has steep flanks and also a pronounced maximum, causing the underlying bit values to be coded unambiguously. According to the invention, it is thus provided that the continuous data signal is also read out precisely at the maximum thereof, since otherwise the advantageous modulation is not fully exploited. The bit sequence, in other words the serial bit data stream, is thus detected in an error-free manner, since the continuous data stream is read out or measured at a suitable point in each case.

Within the individual bit boundaries, in other words during the bit widths BB, filter coefficients may be applied which advantageously modulate the continuous data signal DS.

Filter coefficients of this type may also be referred to as precursors or postcursors. For example, C0 may be referred to as a precursor and C3 may be referred to as a postcursor. Thus, at least one filter coefficient C0 before and at least one filter coefficient C2 and/or C3 after a sampling which is carried out are measured, and these are each taken into account in determining the sampling time. Depending on how the continuous data signal DS is modulated, the at least one filter coefficient may be measured either only before or only after a sampling which is carried out. Thus, only the value of the filter coefficient C0 or the value of the filter coefficient C2 may be taken into account. There are also a plurality of further options in accordance with further aspects for selecting filter coefficients, measuring them, and taking the into account for the selection of the sampling time.

Precursors are the filter coefficients which influence the bits before the sampled bit, and correspondingly postcursors are the filter coefficients which influence the bits after the sampled bit. By way of example, FIG. 3 shows the precursor as C0, whilst C2 and C3 show the postcursors, C1 representing the filter coefficient of the bit to be sampled.

Figure 4:
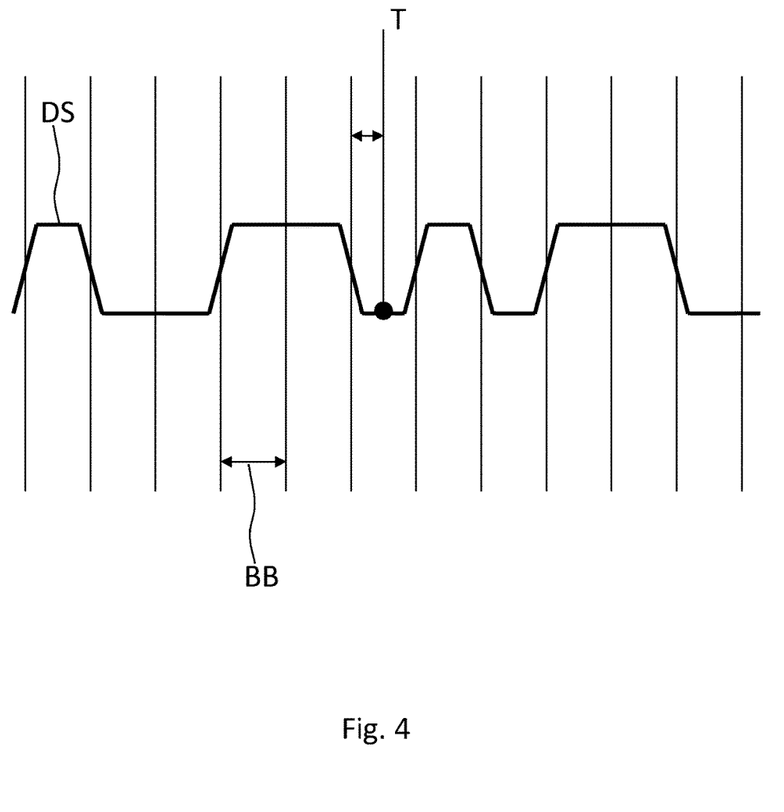
FIG. 4 shows a determination of a sampling time of a data stream in accordance with a further aspect of the present invention.

FIG. 4 shows a determination of a sampling time T of a continuous data signal DS and for detecting a bit value within a bit width BB of a serial bit data stream. The present FIG. 4 schematically shows the progression of the continuous data signal DS with a simplified representation of the flanks. Typically, the continuous data signal DS is read out in the temporal centre of a bit width, since it is assumed that the maximum of the amplitude of the signal strength is located here. However, since this is not the case in some application scenarios and the precise progression of the curve depends on the pre-set filter coefficients, it is particularly advantageous to adapt the time of the sampling to be carried out in such a way that it is at the actual amplitude maximum.

FIG. 4 thus shows not only a determination of a sampling time T, but implicitly also a shift in a sampling point of a sampling to be carried out. Thus, particularly advantageously, a predetermined sampling time can be varied in such a way that it is at the amplitude maximum. The sampling time T determined in this manner can thus be determined relative to a further sampling time. It is also possible according to the invention to determine the sampling time T as a function of a bit width or a boundary of the bit width. It is thus advantageous to define the sampling time T as a relative temporal distance from the boundary of the bit width, since in this way each individual bit can be read out at a fixed, pre-set value after it is determined that the bit boundary is exceeded.

The time T of sampling shown in FIG. 4 may be time-shifted either forwards or backwards, and this is indicated therein by a bidirectional arrow. Typically, the time T of sampling is not on a bit boundary, but rather is arranged temporally within a relevant bit width in each case. The continuous data signal DS shown is measured on a carrier medium and may alternatively or additionally be measured or determined directly in a unit of the receiver. In this context, further units may be connected upstream or downstream, which for example carry out error correction or amplify or adjust the signal.

Figure 5:
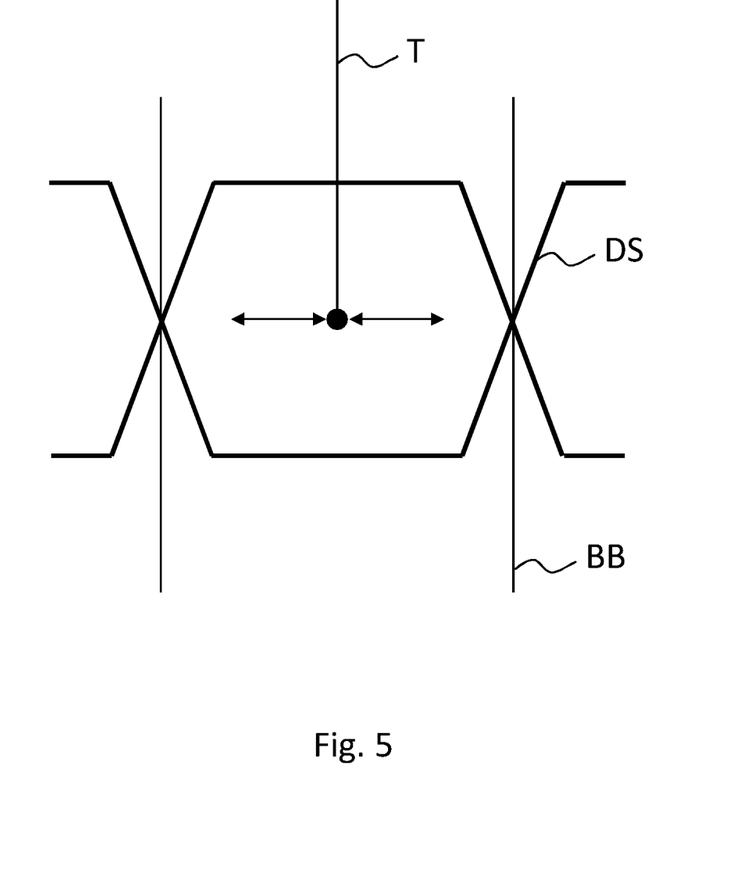
FIG. 5 shows a determination of a sampling time of a continuous data stream in accordance with a further aspect of the present invention.

FIG. 5 shows a further progression of a continuous data signal DS on which a further, additional data signal can be superposed. In this context, the data signal in question is detected on the receiver side and correspondingly further processed. The continuous data signal DS codes a serial bit data stream by means of corresponding signal strengths.

The reception quality of a continuous data signal DS can be determined by way of an eye diagram or the eye opening. For this purpose, the electrical signal progressions can be superposed in such a way that there is a summation of the occurring signal transitions between 0 and 1, by way of which the signal quality of the digital data transmission is assessed using the occurring deviations in a plurality of attempts to receive the same continuous data signal DS.

In accordance with an aspect of the present invention, the vertical and/or horizontal eye opening are determined and make a conclusion possible as to the reception quality. Since a selection of parameters of the transmission medium can thus be measured, the reception quality can be improved by installing a pre-distortion module. Likewise, conclusions as to an expected amplitude of the continuous data signal DS can be determined, and these can be taken into account in determining a suitable sampling time T.

Typically, measurement is carried out in the temporal centre of the eye. However, this can be disadvantageous and offers little or no margin. This means that continuous, rapid readjustment is required. In a distributed system in which transmitters signal to the receiver, however, this is disadvantageous, at least for the latency and bandwidth. Therefore, the eye opening may also be measured in the front or rear temporal third of the eye, and a better prediction as to the quality of the eye is thus obtained, and pre-distortion values can thus be calculated with better margins, resulting in less frequent adjustment.

Figure 6:
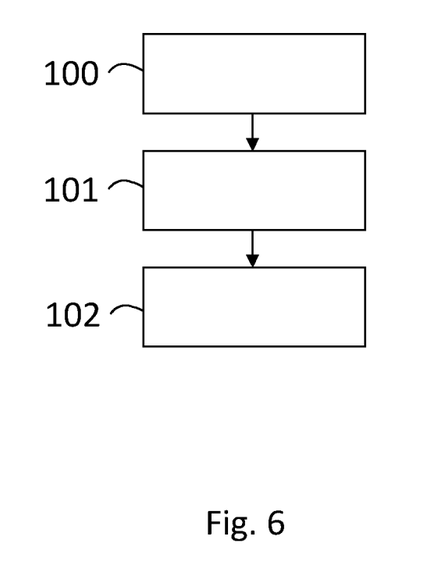
FIG. 6 shows a method for determining a sampling time of a continuous data stream in accordance with an aspect of the present invention.

FIG. 6 shows a method for receiver-side determination of a sampling time T of a continuous data signal DS and for detecting a bit value within a bit width BB of a serial bit data stream. In a first method step 100, at least one filter coefficient of the continuous data stream, provided for modulating the continuous data signal to be transmitted by way of a data signal compensation device, is measured. If these one or more filter coefficients are known, in a further, optional method step a sampling time metric is read out, which specifies by what method a sampling time T is determined. In accordance with one aspect of the present invention, it may be advantageous for the sampling time T to be determined as a function of a sum of signal strengths of the measured filter coefficients. In this context, a person skilled in the art knows conventional methods which take a summation of the filter coefficients into account. However, according to the invention it is particularly advantageous that the sampling time metric provides that the sampling time is located at the minimum of the sum of the signal strengths of the measured filter coefficients. From this, it can thus be calculated as a function of the filter coefficients how the time T of the sampling is to be selected.

Thus, in accordance with an aspect of the present invention, it is possible to determine the time of the sampling of the continuous data signal DS as soon as the measured or at least determined signal strengths of the filter coefficients are known. As a result, it is for example possible to read the expected signal strengths from a data memory, volatile or otherwise, and thus to calculate the sampling time. Thus, filter coefficients may optionally also be read out, whereupon, in method step 101, the sampling time T is determined as a function of the at least one measured, provided, read-out or transmitted filter coefficient and a provided sampling time metric, in such a way that an amplitude of the continuous data signal DS to be transmitted achieves a maximum a this sampling time T. In this case, however, the maximum is strictly temporally limited, in such a way that the method is at least based on a suitable temporal vicinity for the maximum.

In addition, in accordance with a further aspect, the method is directed to an actual measurement or sampling of the continuous data signal DS, and not merely a determination of the sampling time T. Thus, in a further method step 102 the continuous data signal DS is sampled. In this context, a person skilled in the art is aware of how to sample or read out a continuous data signal DS of this type. Further optional method steps include evaluating the measurement result and interpreting the measurement result. Thus, according to the invention a bit configuration of each bit transmitted in a serial bit data stream can be highly reliably established.

Figure 7:
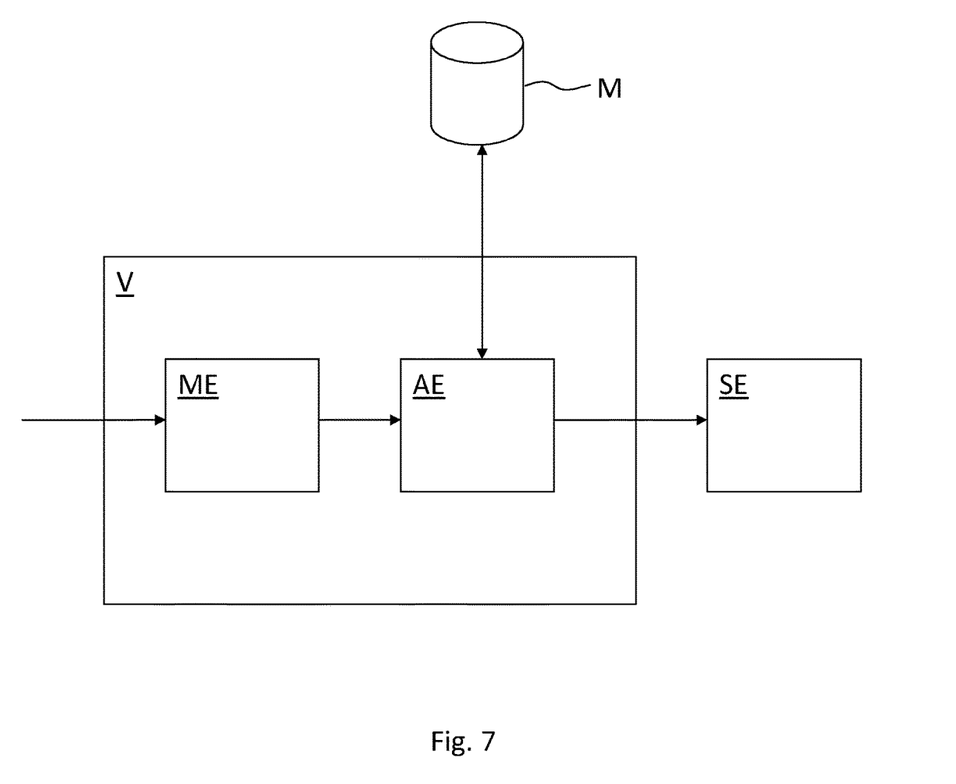
FIG. 7 shows an apparatus for determining a sampling time of a continuous data stream in accordance with an aspect of the present invention.

FIG. 7 shows an apparatus V for receiver-side determination of a sampling time T of a continuous data signal DS and for detecting a bit value within a bit width BB of a serial bit data stream. The apparatus V according to the invention may be part of a corresponding system comprising a transmitter and implemented for data communication via a carrier medium.

The apparatus V comprises a measurement unit ME implemented so as to measure 100 at least one filter coefficient which is provided for modulating the data signal DS to be transmitted by way of a data signal compensation device.

The apparatus V according to the invention further comprises a sampling time unit AE for determining 101 the sampling time T as a function of the at least one measured filter coefficient and a provided sampling time metric in such a way that an amplitude of the continuous data signal to be transmitted achieves a maximum at this sampling time T. For this purpose, the apparatus V may be communicatively connected to a data memory which stores the metric M and makes it available by way of an interface. Further, a sensor unit SE may be linked to the apparatus V, and samples the continuous data signal DS at the determined sampling time T and transmits the signal strength to an evaluation unit, which determines, by way of the signal strength and a provided threshold, whether the measured value codes a 0 or a 1. Further, it is possible to adapt the sampling time metric in such a way that further parameters are taken into account.

Further, a further data memory may be provided which provides control commands which cause the proposed method to be carried out. A computer program of this type, which causes a method in accordance with one of the above-disclosed aspects to be carried out, may be in the form of control commands, machine-orientated commands or a circuit diagram, or may already be provided hard-wired in the form of a correspondingly implemented circuit. Further, it is possible to provide the computer program by means of a data interface before carrying out the method or to provide individual control commands relating to the runtime.

Thus, a method, an apparatus and a system for error-free detection of bit values which are transmitted using a continuous data signal are proposed. A particularly advantageous metric which makes a conclusion possible as to an optimum time for sampling the data signal and thus makes it possible to detect the bit value unambiguously is an aspect of the present invention. In this context, a person skilled in the art is aware that individual method steps can be carried out iteratively and/or in a different order. In addition, further, accompanying method steps and control units are typically to be provided.

The invention claimed is:

1. A method for receiver-side determination of a sampling time of a continuous data signal and for detecting a bit value within a bit width of a serial bit data stream, comprising:
   receiver-side measuring at least one filter coefficient of the continuous data stream, provided for modulating the continuous data signal to be transmitted by way of a data signal compensation device, wherein at least one filter coefficient before and at least one filter coefficient after a sampling which is carried out are measured, and
   determining the sampling time as a function of the at least one measured filter coefficient and a provided sampling time metric, in such a way that an amplitude of the continuous data signal to be transmitted achieves a maximum at this sampling time, wherein the sample time metric provides that the sampling time is determined as a function of a sum of signal strengths of the measured filter coefficients, wherein the sampling time metric provides that the sampling time is located at a minimum of the sum of the signal strengths of the measured filter coefficients.

2. The method according to claim 1, wherein the at least one filter coefficient is measured by at least one measurement method from a set of measuring methods, the set comprising reading out at least one measurement sensor, calculation as a function of transmission parameters, determination, reading out a data memory, reading out a transmission configuration, evaluating an algorithm, in particular an LMS algorithm, determining at least one precursor and determining at least one postcursor.

3. The method according to claim 1, wherein the sampling time metric is provided by at least one provision method from a set, the set comprising reading out a data memory, providing a hard-wired metric unit, providing a metric unit implemented in hardware, providing a metric circuit, providing a correspondingly wired metric component, providing a control unit, and providing a control unit.

4. The method according to claim 1, wherein the sampling time to be determined is determined relative to a further time from a set of times, the set comprising: a further sampling time, a bit width boundary, a data signal flank and a measured amplitude level.

5. The method according to claim 1, wherein a data signal strength is determined so as to measure at least one filter coefficient.

6. The method according to claim 1, wherein the data signal compensation device is formed as at least one unit from a set of units, the set comprising: a control unit, a switchboard, a distortion module, a pre-distortion module, a receiver and a transmitter.

7. The method according to claim 1, wherein the continuous data signal is transmitted using at least one signal carrier medium from a set of media, the set comprising:
   a cable, a conductive connection, a differential line, a coaxial line and a bus line.

8. The method according to claim 1, wherein a measurement device is read out at a predetermined time to determine the amplitude of the data signal.

9. An apparatus for receiver-side determination of a sampling time of a continuous data signal and for determining a bit value within a bit width of a serial bit data stream, comprising:
   a measurement unit arranged to measure at least one filter coefficient which is provided for modulating the data signal to be continuously transmitted by way of a data compensation device, wherein at least one filter coefficient before and at least one filter coefficient after a sampling which is carried out are measured; and
   a sampling time unit for determining the sampling time as a function of the at least one measured filter coefficient and a provided sampling time metric, in such a way that an amplitude of the data signal to be continuously transmitted achieves a maximum at this sampling time, wherein the sampling time metric provides that the sampling time is determined as a function of a sum of signal strengths of the measured filter coefficients, wherein the sampling time metric provides that the sampling time is located at a minimum of the sum of the signal strengths of the measured filter coefficients.

10. A communication system comprising at least one apparatus according to claim 9.

* * * * *